United States Patent [19]

Strantz, Jr. et al.

[11] Patent Number: 4,938,872

[45] Date of Patent: Jul. 3, 1990

[54] TREATMENT FOR REVERSE OSMOSIS MEMBRANES

[75] Inventors: John W. Strantz, Jr.; Warren J. Brehm, both of Wilmington, Del.

[73] Assignee: E. I. Du Pont de Nemours and Company, Wilmington, Del.

[21] Appl. No.: 362,701

[22] Filed: Jun. 7, 1989

[51] Int. Cl.$^5$ .............................................. B01D 13/00
[52] U.S. Cl. ............................... 210/639; 210/500.38; 210/654
[58] Field of Search ................. 55/16, 158; 210/639, 210/654, 500.38

[56] References Cited

U.S. PATENT DOCUMENTS 3,911,080 10/1975 Mehl et al. ..................... 55/16 X Primary Examiner—Frank Spear

[57] ABSTRACT

A process for increasing the salt passage of polyamide reverse osmosis membranes and the resulting membrane is disclosed. The process involves treating the membrane with a dilute aqueous solution of an alkali metal permanganate followed by a stabilization treatment with a dilute aqueous solution of sodium bisulfite or hydrogen peroxide.

17 Claims, No Drawings

TREATMENT FOR REVERSE OSMOSIS MEMBRANES

BACKGROUND OF THE INVENTION

1. Field of the invention

The present invention relates to a process for opening polyamide reverse osmosis membranes to increase the salt passage thereof for certain specialized purposes such as forming very high concentrates of various liquid or liquifiable food products.

2. Prior Art

U.S. Pat. No. 4,643,902 discloses using ultrafiltration to remove bacteria from juices while passing flavor and aroma components of the juice. The bacteria are then treated to inactivate them and the permeate recombined with the retentate which contained the bacteria.

U.S. Pat. No. 3,617,550 discloses a process for concentrating a feed solution by forcing the feed solution through a series of high rejection membranes, recycling or discarding the permeate and then further concentrating the retentate using a series of low rejection membranes where the osmotic pressure of the retentate exceeds the working pressure of the low rejection membranes. Preferably the permeate from the low rejection membranes is recycled. The process enables the production of concentrates having an osmotic pressure of several thousand psi which is above the working pressure of reverse osmosis membranes.

U.S. Pat. No. 3,836,457 discloses a system for concentrating by recycling the permeate from reverse osmosis membranes.

SUMMARY OF THE INVENTION

The present invention relates to a process for reducing the salt rejection of polyamide reverse osmosis membranes by treatment with an aqueous permanganate solution under acidic conditions followed by a stabilization step such as with an aqueous solution of alkali metal bisulfite or hydrogen peroxide.

DETAILED DESCRIPTION OF THE INVENTION

Reverse osmosis membranes are typically used to remove salts from a fluid to produce a purified stream and a concentrated stream which is usually discarded. However, in some applications, particularly in the food industry, the concentrate stream is the desired end product. Reverse osmosis is used to concentrate fruit juices by removing water from the juice while retaining sugars and flavor components. With a standard reverse osmosis membrane, final concentration is dependent on the operating pressure to overcome the osmotic pressure of the concentrated juice. A reverse osmosis unit operated at 1500 psig can produce a concentrated juice containing about 42% sugar (42° Brix). By opening the membrane and allowing some sugar to pass through the membrane, effective osmotic pressure (which is the difference between feed and permeate side osmotic pressure) is reduced. This allows juices to be concentrated to 60–70% or even higher sugar while operating at 1500 psig even though the osmotic pressure of the solution is 3000–4000 psig, by using process techniques disclosed in U.S. Pat. No. 3,617,550 or U.S. Pat. No. 3,836,457.

It has now been found that reverse osmosis membranes can be treated with alkali metal permanganate and particularly $KMnO_4$ in an acidic solution to produce a membrane with increased salt (and sugar) passage and permeate flow. These "special" membranes have been used to concentrate various fruit juices, concentrate salt solutions well above typical reverse osmosis limits, and separate dye from concentrated salt solutions to recover water and salt free of dye. Additionally we found that asymmetric hollow fiber polyamide reverse osmosis membranes when opened, often can be operated at feed pressures above recommended pressure limits set to avoid collapsing the hollow fiber. This allows higher retentate concentration or flow when concentrating fruit juices.

The reverse osmosis membranes suitable are formed from polyamides. They may be of the asymmetric type such as disclosed in U.S. Pat. No. 3,567,632 or the composite thin film type such as those formed by interfacial polymerization. This latter type is disclosed in U.S. Pat. No. 4,277,344; U.S. Pat. No. 4,520,044; U.S. Pat. Nos. 4,529,646; 4,626,468; U.S. Pat. No. 4,643,829; U.S. Pat. No. 4,783,346; or Ser. No. 341,037, filed on Apr. 20, 1989 by Sherman Archie Sundet (AD-5714). The asymmetric type of polyamide reverse osmosis membranes generally are formed by polymerizing meta-phenylene diamine with isophthaloyl chloride, terephthaloyl chloride or mixtures thereof followed by casting or extruding a film or hollow fiber. Solvent is preferentially removed from one side of the film or hollow fiber followed by quenching in a non-solvent for the polymer to freeze in the asymmetric structure. If desired, part of the diamine may be substituted with sulfonic acid groups or salts of sulfonic acid groups. The interfacially polymerized type of polyamide reverse osmosis membrane generally is prepared by casting and partially drying a solution of a polymer (preferably an aromatic polysulfone) to form a microporous film, or tube, and quenching the cast film or tube to freeze in its microporous structure which generally has pores less than 20 nm in diameter. The resulting microporous film or tube is immersed in a dilute solution of meta-phenylene diamine in water, freed of excess diamine solution, and then immersed in a solution of acid chlorides in a solvent which is immiscible with water, such as a chlorofluorocarbon. The acid chlorides are trimesoyl chloride, cyclohexane-1,3,5-tricarbonyl chloride or mixtures thereof. Up to 70 mol percent of th trimesoyl chloride and/or cyclohexane-1,3,5-tricarbonyl chloride can be replaced with a difunctional acyl chloride which can be an aliphatic diaryl chloride containing 4 to 12 carbon atoms, isophthaloyl chloride, terephthaloyl chloride cyclohexane dicarbonyl chlorides or mixtures thereof.

Generally the treatment involves applying a dilute aqueous solution of an alkali metal permanganate, such as an aqueous solution containing 0.02 to 0.5 wt % alkali metal permanganate to the membrane for from 30 minutes to 5 hours for the asymmetric membranes and as little as 30 seconds for the composite membranes. Generally the pH should be adjusted to 2.3–3.0 for the asymmetric type membranes with higher but still acidic pH's being preferred for the composite type membranes. Treatment at pH7 or above tends to be slower but is satisfactory for use with composite membranes. There is a tendency to leave a brown deposit on the membrane when using a pH above 7. Sulfuric acid is preferred to adjust the pH, but other acids such as hydrochloric acid can be used. Generally the solution is circulated through the membrane at 50–100 psig (345–690 kPa). The pressure does not appear to be critical, but sufficient pressure is desirable to obtain some permeate flow to permit measurement of permeate conductivity. This allows a determination of when to end the permanganate treatment to achieve the desired final salt passage. The membranes can be opened by a static exposure to the solution, but determining the end point is more difficult and the process requires more time (for the asymmetric membrane).

The amount of alkali metal permanganate used is more a function of the surface area of the membrane being treated than concentration of the solution being used. The alkali metal permanganate is consumed during the treatment and enough must be present to bring about the desired opening of the membrane. Generally the concentration of alkali metal permanganate is from 0.2 to 5 g/l. The concentration of alkali metal permanganate used is not particularly critical. However, alkali metal permanganate is consumed by the process, so when using very dilute concentrations of alkali metal permanganate enough solution must be used so that the desired amount of opening of the membrane can be achieved. At very high concentrations of alkali metal permanganate, and particularly when using a low pH, control of the desired amount of opening of the membrane can become difficult, since the amount of opening is very time dependent. After the permanganate treatment, preferably the membrane is flushed with water to remove excess permanganate from the module. After the water flush the membrane is stabilized by treatment with a dilute aqueous solution of alkali metal bisulfite or dilute aqueous solution of hydrogen peroxide which preferably is an aqueous solution of 0.25 to 5 wt % alkali metal bisulfite or 0.01 to 0.1 wt % hydrogen peroxide. The bisulfite treatment is preferred. After stabilization a final water flush is performed.

The amount of opening of the membrane depends on the intended use of the membrane. Thus for some desalination of brackish water a salt passage of 7% may be desirable, whereas for the final concentration step in processing orange juice a salt passage of as high as 70% to 98% is often desirable. With the present process membranes can readily be treated to provide a complete range of salt passages as may be desired for various end use applications. A membrane can be reexposed to the process to increase its salt passage at a later time if so desired.

When the membranes are opened with alkali metal permanganate without a subsequent stabilization with alkali metal bisulfite or hydrogen peroxide the membranes continue to open, even after flushing with water, for a period of several months. This is undesirable in use, because the salt passage of the membranes affects other control parameters in the process for which the membrane is intended. Membranes stabilized in accordance with the present invention using alkali metal bisulfite or hydrogen peroxide promptly achieve final salt passage and retain nearly constant salt passages and flow rates in use over long periods of time. This is an important advantage for most end uses, such as concentrating fruit juices.

The membranes of the present invention may be opened to salt (NaCl) passages as high as 98%. This ensures that the membrane is still acting as a reverse osmosis membrane as opposed to acting as a microfiltration membrane or ultrafiltration membrane. It should be remembered that passage of fruit juice components will be different than the passage of salt through the membrane.

EXAMPLES

EXAMPLE 1

Four permeators containing polyaramide hollow fibers having a surface area of about 700 sq. ft. (65 m$^2$) were treated with an aqueous solution of potassium permanganate and sodium chloride. The hollow fibers were produced by extrusion of a solution of a polyamide formed by reacting meta-phenylene diamine and meta-phenylene diamine-4-sulfonic acid with a 70/30 mixture of isophthaloyl chloride and terephthaloyl chloride as described in Example II of U.S. Pat. No. 3,567,632.

Each of the units was flushed with water at 60 psi (415 kPa) applied to the outside of the fibers for one hour. The units were charcterized after one hour at 800 psig (5515 kPa), 30% conversion, with an aqueous solution of 30,000 ppm NaCl and 25° C. The salt passages and flows are reported in Table I below. For each run a 33 gallon (0.125 m$^3$) plastic tank was filled with 30 gallons (0.114 m$^3$) of water containing 30,000 ppm NaCl. Thirty grams of KMnO$_4$ were dissolved in a 500 ml beaker of water and mixed with the water in the plastic tank. Hydrochloric acid was added to the plastic tank to reduce the pH to 2.5-2.9. The permeators were installed one at a time on a test stand. The solution in the plastic tank was circulated through the permeators at 800 psig (5515 kPa). The product conductivity and flow, brine flow, feed pressure and tank temperature were monitored and recorded every five minutes. When product conductivity reached the following conductivities circulation was stopped: A—5,500 micro S/cm (micro Siemens per centimeter), B—9,000 micro S/cm, C—4,500 micro S/cm, D—3,300 micro S/cm. After the desired product conductivity was reached the permeators were quickly removed from the test stand and flushed with water overnight. The permeators were then tested at 800 psig (5515 kPa), 30% conversion, 30,000 ppm NaCl and 25° C. The results are reported in Table I below. The units were flushed with water for a minimum of ½ hour. One unit, A, was then treated with a solution of 11 g NaHSO$_3$ in 11 liters of water which was circulated through the permeator for 15 minutes and then the performance tested at 800 psig (5515 kPa), 30,000 ppm NaCl at 30% conversion at 25° C. Unit B was was flushed with water for ½ hour on a flush stand and then performance retested at 800 psig (5515 kPa), 30,000 ppm NaCl, at 30% conversion at 25° C. The results are reported in Table I below.

TABLE I

| | Before Treatment | | | After Treatment | | |
|---|---|---|---|---|---|---|
| Run | Flow gpm | (m$^3$/m$^2$) | Salt Passage % | Flow gpm | (m$^3$/m$^2$) | Salt Passage % |
| A | 0.116 | (0.44 × 10$^{-3}$) | 0.7 | 0.378 | (1.43 × 10$^{-3}$) | 42.3 |
| B | 0.150 | (0.57 × 10$^{-3}$) | 4.0 | 0.505 | (1.9 × 10$^{-3}$) | 58.7 |
| C | 0.154 | (3.78 × 10$^{-3}$) | 3.9 | 0.488 | (1.85 × 10$^{-3}$) | 50.4 |
| D | 0.171 | (0.65 × 10$^{-3}$) | 3.3 | 0.288 | (1.90 × 10$^{-3}$) | 23.7 |

| | After NaHSO$_3$ | | | After Treatment | | |
|---|---|---|---|---|---|---|
| Run | Flow gpm | (m$^3$/m$^2$) | Salt Passage % | Flow gpm | (m$^3$/m$^2$) | Salt Passage % |
| A | 0.679 | (2.57 × 10$^{-3}$) | 75.6 | 0.691 | (2.61 × 10$^{-3}$) | 77.8 |
| B | | | | 0.519 | | 59.3 |

EXAMPLE II

Two 4" permeators containing the same type of polyaramide fibers as the permeators tested in Example 1 but having about 1750 sq. ft. (163 m²) of surface area were characterized on a test stand at 800 psig (5515 kPa), 30,000 ppm NaCl in water, a 30% conversion and 25° C. The treatment and test conditions were the same as in Example 1 except that the product conductivity and flowmeter, brine flowmeter, pressure gauges, tank temperature and pH were monitored at 10-15 minute intervals. As the product conductivity began to increase the monitoring was done at more frequent intervals. The pH was adjusted as required to maintain the 2.5-2.8 range. When the product conductivity reached 30,000 micro S/cm, the $KMnO_4$ feed stream was stopped and the unit flushed with water using a reverse flow technique where water was fed to the brine port of the permeator stopped and started to pulse flow. The unit was tested using the conditions set forth above.

TABLE II

| | Before Treatment | | After Treatment | | |
|---|---|---|---|---|---|
| | Flow | Salt Passage | Flow | | Salt Passage |
| Run | gpm | (m³/m²) | % | gpm | (m³/m²) | % |
| E | 0.93 | (3.52 × 10⁻³) | 1.4 | 2.10 | (7.95 × 10⁻³) | 57.1 |
| F | 0.98 | (3.71 × 10⁻³) | 1.6 | 2.61 | (9.88 × 10⁻³) | 68.1 |

| | Second Test After Treatment | | |
|---|---|---|---|
| | Flow | | Salt Passage |
| Run | gpm | (m³/m²) | % |
| E | 2.68 | (10.14 × 10⁻³) | 72.9 |
| F | 2.98 | (11.28 × 10⁻³) | 72.7 |

EXAMPLE III

Two permeators containing the polyaramide hollow fibers of Example I but having a surface area of about 1750 sq. ft. (163 m²) and similar initial permeation properties as Example II were treated with 30 gallons (0.114 m3) of water containing 30 g $KMnO_4$ and enough NaCl to raise the conductivity of the water to 5600 micro S/cm. A pH controller on the tank containing the water was set to pH 2.8. The pH was adjusted with $H_2SO_4$. A second tank was filled with 30 gallons (0.114 m³) water containing 2.5 lb (1.136 Kg) $NaHSO_3$. The water containing the $KMnO_4$ was circulated through the permeator at 55 psig (379 kPa) and the feed and permeate conductivity, feed and concentrate pressure, feed temperature, feed pH and permeate flow were monitored every ten minutes until permeate conductivity reached 1,000 micro S/cm. Then conditions were monitored every 5 minutes. When permeate conductivity reached 1,300 micro S/cm it was monitored frequently and the $KMnO_4$ treatment cycle was ended and a water flush cycle initiated as soon as conductivity reached 1400 micro S/cm. Following the water flush the bisulfite was flushed through the permeator until the 30 gallons was used. The units were tested at 800 psig (5515 kPa) feed pressure, 30% conversion, 30,000 ppm NaCl in water at 25° C. The performance after treatment is reported in Table III below.

TABLE III

| | Salt Passage | Flow | |
|---|---|---|---|
| Run | % | gpm | (m³/m²) |
| G | 72.5 | 1.99 | (7.53 × 10⁻³) |
| H | 82.9 | 2.29 | (8.67 × 10⁻³) |

EXAMPLE IV

Flat film tests, using an interfacially polymerized polyaramide membrane, were performed to evaluate the effect of combinations of $KMnO_4$ or $NaMnO_4$ stabilized with $NaHSO_3$ or $KHSO_3$ at various pH values in the production of membranes in accordance with the present invention. The membranes were produced by interfacially polymerizing an aqueous solution of m-phenylene diamine impregnated in a microporous polysulfone support with a solution of cyclohexane-1,3,5-tricarbonyl chloride in 1,1,2-trichloro-1,2,2-trifluoroethane, such as described in U.S. Pat. No. 4,529,646. The data reported in Tables IV and V, indicate that $KMnO_4$ or $NaMnO_4$ can be used to open the membranes and that $NaHSO_3$ or $KHSO_3$ can be used to stabilize the opened membranes. Table VI reports the performance of eight untreated similar membranes for comparison.

The membranes were opened by soaking them for 5 minutes in a 0.025 weight percent aqueous solution of $KMnO_4$ or $NaMnO_4$ followed by rinsing in water. The membranes were then stabilized by soaking them for 10 minutes in a 1 weight percent aqueous solution of bisulfite.

The data demonstrate the influence of pH on membrane openess. Membranes soaked in solutions of $KMnO_4$ and $NaMnO_4$ adjusted to pH3 are more open than the membranes soaked in the same solutions, but at higher pH.

Some membranes, such as the one treated with $NaMnO_4/NaHSO_3$ at pH9 reported in Tables IV and V and one of the untreated samples reported in Table VI had a lower flow than normal. Unexpectedly these samples also had high salt passage. The reason for this behavior of these membranes is not at present understood.

TABLE IV

| Salt Passage of Treated Composite Film | | | |
|---|---|---|---|
| Treatment Chemicals | Salt Passage - % | | |
| | pH = 3 | pH = 6 | pH = 9 |
| $KMnO_4/NaHSO_3$ | 34.5 | 21.1 | 27.2 |
| $NaMnO_4/NaHSO_3$ | 46.7 | 19.3 | 27.4 |
| $KMnO_4KHSO_3$ | 40.3 | 24.7 | 15.0 |
| $NaMnO_4/KHSO_3$ | 50.1 | 18.0 | 13.9 |

TABLE V

| Permeate Flow of Treated Composite Film | | | |
|---|---|---|---|
| Treatment Chemicals | Permeate Flow - GPM | | |
| | pH = 3 | pH = 6 | pH = 9 |
| $KMnO_4/NaHSO_3$ | .0028 | .0020 | .0012 |
| $NaMnO_4/NaHSO_3$ | .0024 | .0018 | .0007 |
| $KMnO_4/KHSO_3$ | .0030 | .0007 | .0016 |
| $NaMnO_4/KHSO_3$ | .0025 | .0013 | .0014 |

Test Condition:
Feed Pressure = 100 psig,
Feed Solution = 2000 ppm NaCl,
Temperature = 25° C.

TABLE VI

| Untreated Composite Film Performance | |
| --- | --- |
| Salt Passage % | Permeate Flow GPM |
| 7.4 | .0013 |
| 8.1 | .0007 |
| 10.4 | .0012 |
| 6.4 | .0011 |
| 6.4 | .0012 |
| 6.1 | .0011 |
| 6.4 | .0012 |
| 7.8 | .0011 |
| Average 7.4 | .0011 |

Test Condition:
Feed Pressure = 100 psig,
Feed Solution = 2000 ppm NaCl,
Temperature = 25° C.

We claim:

1. A process for increasing the salt passage of a polyamide reverse osmosis membrane comprising contacting said membrane with a dilute aqueous solution of alkali metal permanganate for a sufficient time to open the membrane to the desired salt passage, flushing said membrane with water to remove permanganate, contacting said membrane with a dilute aqueous solution of alkali metal bisulfite, or dilute aqueous solution of hydrogen peroxide to stabilize said membrane and flushing said membrane with water.

2. The process of claim 1 wherein the stabilization step is with a solution of 0.25 to 5 percent by weight alkali metal bisulfite or 0.01 to 0.1 weight percent hydrogen peroxide.

3. The process of claim 2 wherein the alkali metal permanganate solution has a concentration of from 0.02 to 0.5 weight percent.

4. The process of claim 3 wherein the membrane is contacted with the permanganate solution for from 30 seconds to 5 hours.

5. The process of claim 4 wherein the membrane is contacted with the permanganate solution under sufficient pressure to cause said permanganate solution to permeate the membrane.

6. The process of claim 5 wherein the polyamide is the polymerization product of a primary polyamine.

7. The process of claim 6 wherein the polyamide is the polymerization product of an aromatic primary diamine.

8. The process of claim 7 wherein the polyamide is the polymerization product of meta-phenylene diamine and a cyclic organic di- or triacyl chloride.

9. A polyamide reverse osmosis membrane which has been treated with a dilute solution of alkali metal permanganate to increase its salt passage, followed by treatment with a dilute aqueous solution of alkali metal bisulfite, or hydrogen peroxide to stabilize its salt passage.

10. The reverse osmosis membrane of claim 9 which is in the form of a hollow fiber, film or tube.

11. The membrane of claim 10 which is in the form of a hollow fiber.

12. The membrane of claim 11 which is asymmetric in structure.

13. The membrane of claim 12 which is formed from a polyaramide.

14. The membrane of claim 13 which is formed by polymerizing meta-phenylenediamine and isophthaloyl chloride, terephthaloyl chloride or mixtures thereof.

15. The membrane of claim 10 which is in the form of a film.

16. The membrane of claim 15 which is in the form of a composite membrane.

17. The membrane of claim 16 which is formed by polymerizing m-phenylenediamine with a cyclic organic di- or triacyl chloride.

* * * * *